United States Patent
Anzicek

(10) Patent No.: US 9,272,633 B2
(45) Date of Patent: Mar. 1, 2016

(54) MOTIVE BATTERY THERMAL INITIALIZATION ALGORITHM

(71) Applicant: Robert Bosch Battery Systems LLC, Orion, MI (US)

(72) Inventor: Joshua M. Anzicek, Clarkston, MI (US)

(73) Assignee: Robert Bosch Battery Systems, LLC, Orion, MI (US)

(*) Notice: Subject to any disclaimer, the term of this patent is extended or adjusted under 35 U.S.C. 154(b) by 125 days.

(21) Appl. No.: 13/838,811

(22) Filed: Mar. 15, 2013

(65) Prior Publication Data
US 2013/0289812 A1  Oct. 31, 2013

Related U.S. Application Data

(60) Provisional application No. 61/638,216, filed on Apr. 25, 2012.

(51) Int. Cl.
*B60L 11/18* (2006.01)
*B60L 3/00* (2006.01)
*B60L 3/04* (2006.01)

(52) U.S. Cl.
CPC .......... *B60L 11/1851* (2013.01); *B60L 3/0046* (2013.01); *B60L 3/04* (2013.01); *B60L 11/1816* (2013.01); *B60L 11/1861* (2013.01); *B60L 11/1864* (2013.01); *B60L 11/1874* (2013.01); *B60L 11/1875* (2013.01); *B60L 11/1892* (2013.01); *B60L 11/1894* (2013.01); *B60L 2240/545* (2013.01); *B60L 2250/16* (2013.01); *B60L 2260/52* (2013.01); *B60L 2260/54* (2013.01); *Y02T 10/7044* (2013.01);
CPC ...... *Y02T10/7061* (2013.01); *Y02T 90/14* (2013.01); *Y02T 90/34* (2013.01)

(58) Field of Classification Search
CPC .......... B60L 11/1851; B60L 11/1864; B60L 11/1874; B60L 11/1875; B60L 3/04; B60L 3/0046; B60L 2240/545; H01M 10/5016
USPC .......................................................... 701/22
See application file for complete search history.

(56) References Cited

U.S. PATENT DOCUMENTS

| | | | | |
|---|---|---|---|---|
| 7,629,773 | B2 * | 12/2009 | Eberhard et al. | 320/150 |
| 8,555,659 | B2 * | 10/2013 | Hermann et al. | 62/115 |
| 8,620,506 | B2 * | 12/2013 | Kummer et al. | 701/22 |
| 8,781,658 | B2 * | 7/2014 | Simonini | 701/22 |
| 9,002,568 | B2 * | 4/2015 | Datta et al. | 701/29.1 |
| 2009/0021221 | A1 | 1/2009 | Krauer et al. | |
| 2011/0316486 | A1 | 12/2011 | Inaba et al. | |
| 2012/0158228 | A1 * | 6/2012 | Biondo et al. | 701/22 |

FOREIGN PATENT DOCUMENTS

EP 2226887 A1  9/2010

OTHER PUBLICATIONS

International Search Report and Written Opinion corresponding to PCT Application No. PCT/US2013/037057, mailed Jul. 7, 2014 (10 pages).

* cited by examiner

*Primary Examiner* — Todd Melton
(74) *Attorney, Agent, or Firm* — Maginot Moore & Beck LLP

(57) ABSTRACT

A system includes a battery control module that determines at least one temperature associated with a battery pack of an electric vehicle. An electric vehicle control module selects between a plurality of operating modes of the electric vehicle based on the at least one temperature. The plurality of operating modes includes a first mode and a second mode. In the first mode the electric vehicle control module prevents the electric vehicle from being turned on. In second mode the electric vehicle control module allows the electric vehicle to be turned on in response to a determination that the battery pack has sufficient energy to adjust the at least one temperature a predetermined amount and to drive the vehicle a predetermined distance.

18 Claims, 4 Drawing Sheets ial and specific examples are intended for purposes of illustration only and are not intended to limit the scope of the disclosure.

MOTIVE BATTERY THERMAL INITIALIZATION ALGORITHM

CROSS-REFERENCE TO RELATED APPLICATIONS

This application claims the benefit of U.S. Provisional Application No. 61/638,216, filed on Apr. 25, 2012. The disclosure of the above application is incorporated herein by reference in its entirety.

FIELD

The present disclosure relates to startup control for an electric vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Battery systems may be used to provide power in a wide variety of applications. Exemplary transportation applications include hybrid electric vehicles (HEV), electric vehicles (EV), heavy duty vehicles (HDV) and vehicles with 42-volt electrical systems. Exemplary stationary applications include backup power for telecommunications systems, uninterruptible power supplies (UPS), and distributed power generation applications.

Examples of the types of batteries that are used include nickel metal hydride (NiMH) batteries, lead-acid batteries, and other types of batteries. A battery system may include a plurality of battery subpacks that are connected in series and/or in parallel. The battery subpacks may include a plurality of batteries that are connected in parallel and/or in series.

SUMMARY

A system includes a battery control module that determines at least one temperature associated with a battery pack of an electric vehicle. An electric vehicle control module selects between a plurality of operating modes of the electric vehicle based on the at least one temperature. The plurality of operating modes includes a first mode and a second mode. In the first mode the electric vehicle control module prevents the electric vehicle from being turned on. In second mode the electric vehicle control module allows the electric vehicle to be turned on in response to a determination that the battery pack has sufficient energy to adjust the at least one temperature a predetermined amount and to drive the vehicle a predetermined distance.

A method includes determining at least one temperature associated with a battery pack of an electric vehicle, and selecting between a plurality of operating modes of the electric vehicle based on the at least one temperature. The plurality of operating modes includes a first mode and a second mode. In the first mode the electric vehicle is prevented from being turned on. In the second mode the electric vehicle is allowed to be turned on in response to a determination that the battery pack has sufficient energy to adjust the at least one temperature a predetermined amount and to drive the vehicle a predetermined distance.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

During startup of an electric vehicle (e.g. when the vehicle is keyed on) that includes a battery (i.e., a battery pack or system that includes a plurality of batteries or subpacks), battery characteristics may affect performance of the battery. For example, at a given time when the vehicle is keyed on, various temperature characteristics of the battery may be outside of an acceptable usage range of the battery. In some circumstances, the characteristics may prevent a user from starting up and using the vehicle to avoid adversely affecting the battery.

An electric vehicle control module according to the present disclosure monitors a plurality of battery characteristics to determine whether to allow the user to start up and drive the vehicle. For example, when the vehicle is keyed on, the electric vehicle control module determines battery characteristics such as battery temperature, available energy, energy required to heat or cool the battery to an acceptable usage range, and/or a minimum reserve energy required for driving the car a predetermined distance. The electric vehicle control module may prevent the vehicle from starting up, allow the vehicle to start up with full functionality, or allow the vehicle to start up with only limited functionality (e.g., to perform self-heating or cooling) based on the determined battery characteristics.

Figure 1:
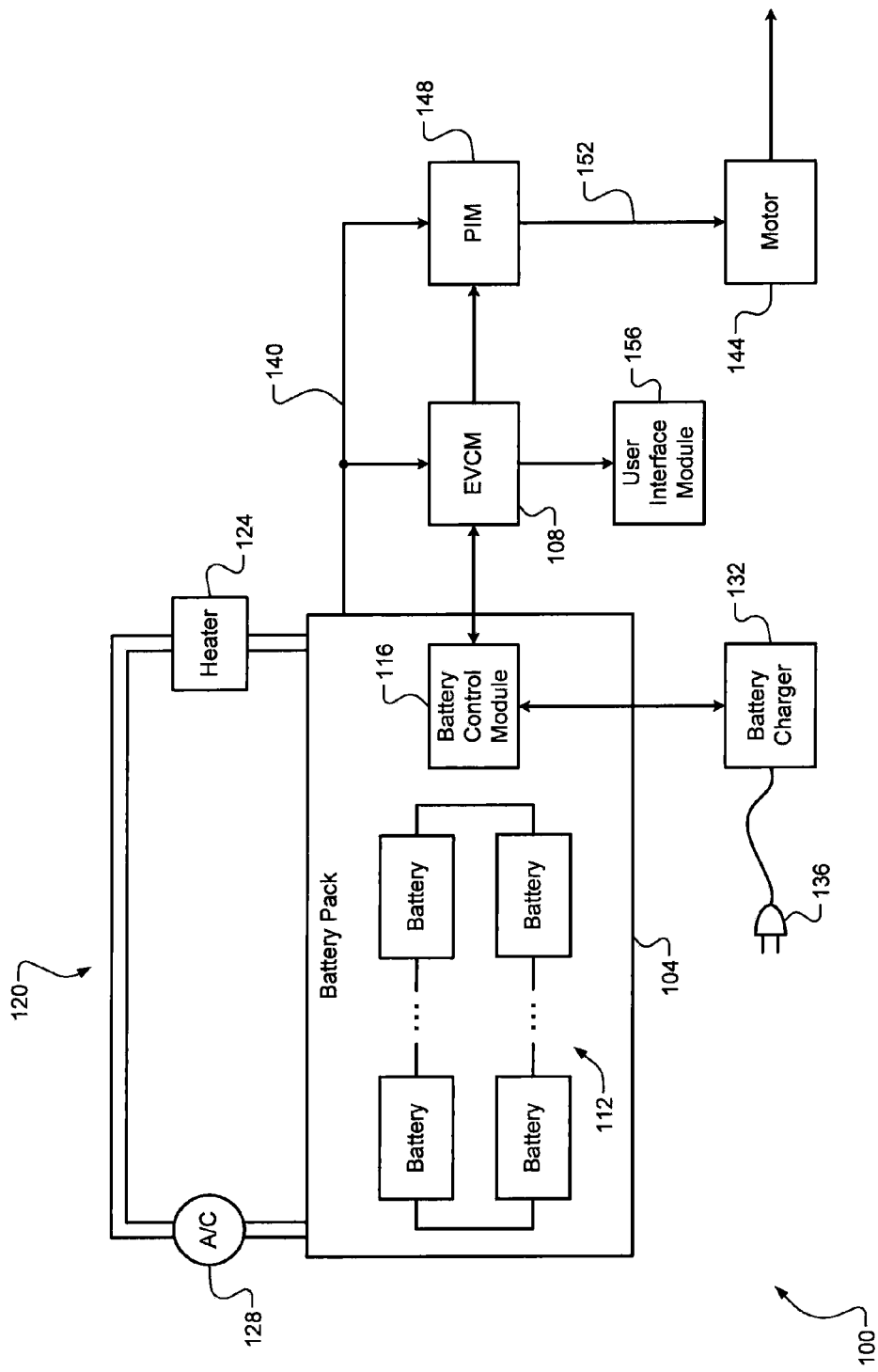
FIG. 1 is a functional block diagram of an electric vehicle according to the principles of the present disclosure.

Referring now to FIG. 1, an electric vehicle 100 includes a battery pack 104 and an electric vehicle control module (EVCM) 108. The battery pack 104 includes a plurality of batteries 112 and battery control module 116. The battery control module 116 controls various functions of the battery pack 104 and monitors and collects various characteristics of the battery pack 104. For example, the battery control module 116 monitors characteristics including, but not limited to, a voltage, a current, and a temperature associated with the battery pack 104. The battery control module 116 may determine performance variables of the battery pack 104 based on the characteristics. For example only, the battery control module 116 may estimate a state of charge (SOC) of the battery pack 104 based on the voltage, current, and temperature of the battery pack 104.

The battery control module 116 may initiate heating and/or cooling of the battery pack 104 based on the temperature. For example, a coolant system 120 may provide liquid coolant that flows through the battery pack 104 to heat and cool the battery pack 104. The coolant system 120 may include a heater 124 that heats the coolant when the temperature of the battery pack 104 is less than a low temperature threshold, and an air conditioner/compressor 128 that cools the coolant when the temperature of the battery pack 104 is greater than a high temperature threshold.

The battery control module 116 communicates with battery charger 132. The battery charger 132 charges the battery pack 104 and may include a user interface (not shown) for providing visual indications of the condition of the battery pack 104 (e.g., the SOC of the battery pack 104). The battery charger 132 includes a plug 136 that interfaces with a power source (not shown) to provide charging power to the battery pack 104 via the battery charger 132.

The EVCM 108 communicates with the battery pack 104 and the battery control module 116 to control various functions of the vehicle 100. For example, the EVCM 108 receives a voltage 140 from the battery pack 104. Conversely, the EVCM 108 receives information from the battery control module 116 related to, for example only, the monitored characteristics of the battery pack 104 and functions of the battery control module 116, the coolant system 120, and the battery charger 132.

The EVCM 108 controls a motor 144 of the vehicle 100 via a power inverter module (PIM) 148. The PIM 148 converts a direct current (DC) voltage (e.g., the voltage 140) to an alternating current (AC) voltage 152 and provides the AC voltage 152 to the motor 144. The motor 144 provides rotational force to drive wheels (not shown) of the vehicle 100.

When the vehicle 100 is keyed on, the EVCM 108 determines whether any of the monitored characteristics of the battery pack 104 are outside of a usage range for the battery pack 104. For example, the EVCM 108 may determine whether a temperature of the battery pack 104 is less than the low temperature threshold or greater than the high temperature threshold, and/or whether the SOC of the battery pack 104 is sufficient to provide power to drive the vehicle 100 some predetermined distance. The EVCM 108 performs one or more functions based on the monitored characteristics. For example, the EVCM 108 may prevent the vehicle 100 from being powered on and indicate that the vehicle 100 should be charged (e.g., plugged in to a power source), enable heating or cooling of the vehicle 100, and/or allow the vehicle 100 to be powered on and driven the predetermined distance with limited functionality.

The EVCM 108 may communicate with a user interface module 156 to indicate a status of the vehicle 100 (e.g., a status of the battery pack 104). For example, the user interface module 156 may indicate, in response to the determinations of the EVCM 108, that the vehicle 100 should be plugged in to charge the battery pack 104, that the vehicle 100 can only be driven the predetermined distance, or that the vehicle 100 may be operated with full functionality.

Figure 2:
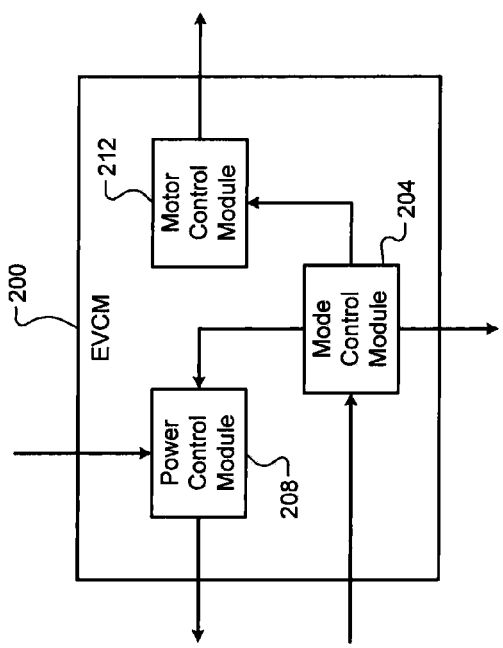
FIG. 2 is a functional block diagram of an electric vehicle control module (EVCM) according to the principles of the present disclosure.

Referring now to FIG. 2, an example EVCM 200 includes a mode control module 204, a power control module 208, and a motor control module 212. The mode control module 204 selects operating modes of the vehicle 100 via the EVCM 200 according to monitored characteristics received from the battery pack 104. The operating modes may correspond to different temperatures of the battery pack 104 and associated performance capabilities of the vehicle 100 based on the temperatures.

For example, if a minimum temperature of the battery pack 104 (e.g., a minimum temperature of a module of the battery pack 104) is less than or equal to a first temperature threshold (T1), then the mode control module 204 selects a first operating mode. The first temperature threshold T1 corresponds to a "cold disable" temperature. For example only, T1 is −40 degrees Celsius. Temperatures less than the cold disable temperature may prevent the battery pack 104 from operating properly. Accordingly, in the first operating mode, the mode control module 204 prevents the vehicle 100 from being started and indicates that the battery pack 104 requires charging. For example, the mode control module 204 may communicate with the user interface module 156 to provide an indication that the vehicle 100 should be plugged in.

If the minimum temperature of the battery pack 104 is greater than the first temperature threshold T1 but less than or equal to a second temperature threshold (T2), then the mode control module 204 selects a second operating mode. The second temperature threshold T2 corresponds to a "cold limited" temperature. For example only, T2 is −30 degrees Celsius. Temperatures greater than the cold disable temperature and less than or equal to the cold limited temperature may not require the vehicle 100 to be plugged in and charged, but may instead require that the vehicle 100 enable heating of the battery pack 104 above the cold limited temperature. Accordingly, in the second operating mode, the mode control module 204 enables heating of the battery pack 104.

Further, the mode control module 204 may determine whether the battery pack 104 has sufficient energy to heat the battery pack 104 above the cold limited temperature. For example, the mode control module 204 may also determine whether the battery pack 104 has sufficient energy to heat the battery pack 104 from a current temperature to a target temperature greater than the cold limited temperature and also drive the vehicle 100 for a predetermined distance. For example only, the predetermined distance may correspond to a calibrated minimum driving distance, a user input driving distance, and/or a distance to a nearest charging location. If the battery pack 104 does not have sufficient energy to heat the battery pack 104, then the mode control module 204 may instead select the first mode and provide an indication that the vehicle 100 should be plugged in.

If a maximum temperature of the battery pack 104 (e.g., a maximum temperature of a module of the battery pack 104) is greater than the second temperature threshold T2 but less than or equal to a third temperature threshold (T3), then the mode control module 204 selects a third operating mode. The third temperature threshold T3 corresponds to a "hot limited" temperature. For example only, T3 is 50 degrees Celsius. Temperatures greater than the cold limited temperature and less than or equal to the hot limited temperature are within a normal operating range of the battery pack 104 and do not require further actions by the EVCM 200. Accordingly, in the third operating mode, the mode control module 204 allows the vehicle 100 to be turned on and operated and driven normally with full functionality.

If the maximum of the battery pack 104 is greater than the third temperature threshold T3 and less than or equal to a fourth temperature threshold (T4), then the mode control module 204 selects a fourth operating mode. The fourth temperature threshold T4 corresponds to a "hot disable" temperature. For example only, T4 is 60 degrees Celsius. Temperatures greater than the hot limited temperature and less than or equal to the hot disable temperature may not require the vehicle 100 to be plugged in and charged, but may instead require that the vehicle 100 enable cooling of the battery pack 104 below the hot limited temperature. Accordingly, in the fourth operating mode, the mode control module 204 enables cooling of the battery pack 104. Further, the mode control module 204 may determine whether the battery pack 104 has sufficient energy to cool the battery pack 104 below the hot limited temperature. For example, the mode control module 204 may also determine whether the battery pack 104 has sufficient energy to cool the battery pack 104 from a current temperature to a target temperature less than the hot limited temperature and also drive the vehicle 100 for the predetermined distance. If the battery pack 104 does not have sufficient energy to cool the battery pack 104, then the mode control module 204 may instead select the first mode and provide an indication that the vehicle 100 should be plugged in.

If the maximum temperature of the battery pack 104 is greater than the hot disable temperature, then the mode control module selects a fifth operating mode. Temperatures greater than the hot disable temperature may prevent the battery pack 104 from operating properly. Accordingly, in the fifth operating mode, the mode control module 204 prevents the vehicle 100 from being started and indicates that the battery pack 104 requires charging. For example, the mode control module 204 may communicate with the user interface module 156 to provide an indication that the vehicle 100 should be plugged in.

The mode control module 204 communicates with the power control module 208, the motor control module 212, and the user interface module 156 (as shown in FIG. 1) according to the selected mode. For example, in each of the modes, the mode control module 204 communicates with the user interface module 156 to indicate the mode to the driver, including, but not limited to, any operating restrictions, maximum driving distance, and/or whether the battery pack 104 should be plugged in and charged. In modes requiring heating or cooling, and/or allowing limited or full functionality of the vehicle 100, the mode control module 204 communicates with the power control module 208 to provide sufficient power to operate, for example, the heater 124, the air conditioner 128, or any other function associated with the selected mode. In modes allowing the vehicle 100 to be operated and driven, the mode control module 204 communicates with the motor control module 212 to control the motor 144.

Figure 3A:
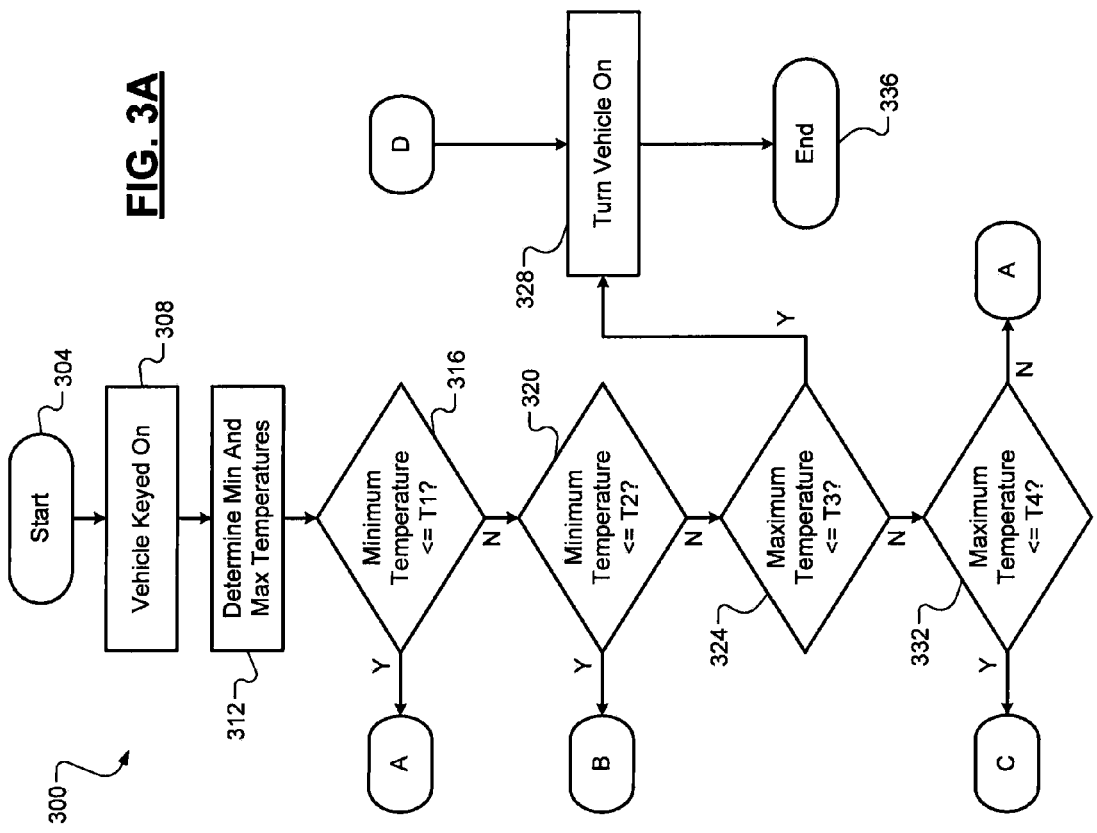
FIGS. 3A, 3B, 3C, and 3D illustrate a method of operating an electric vehicle according to the principles of the present disclosure.
Figure 3B:
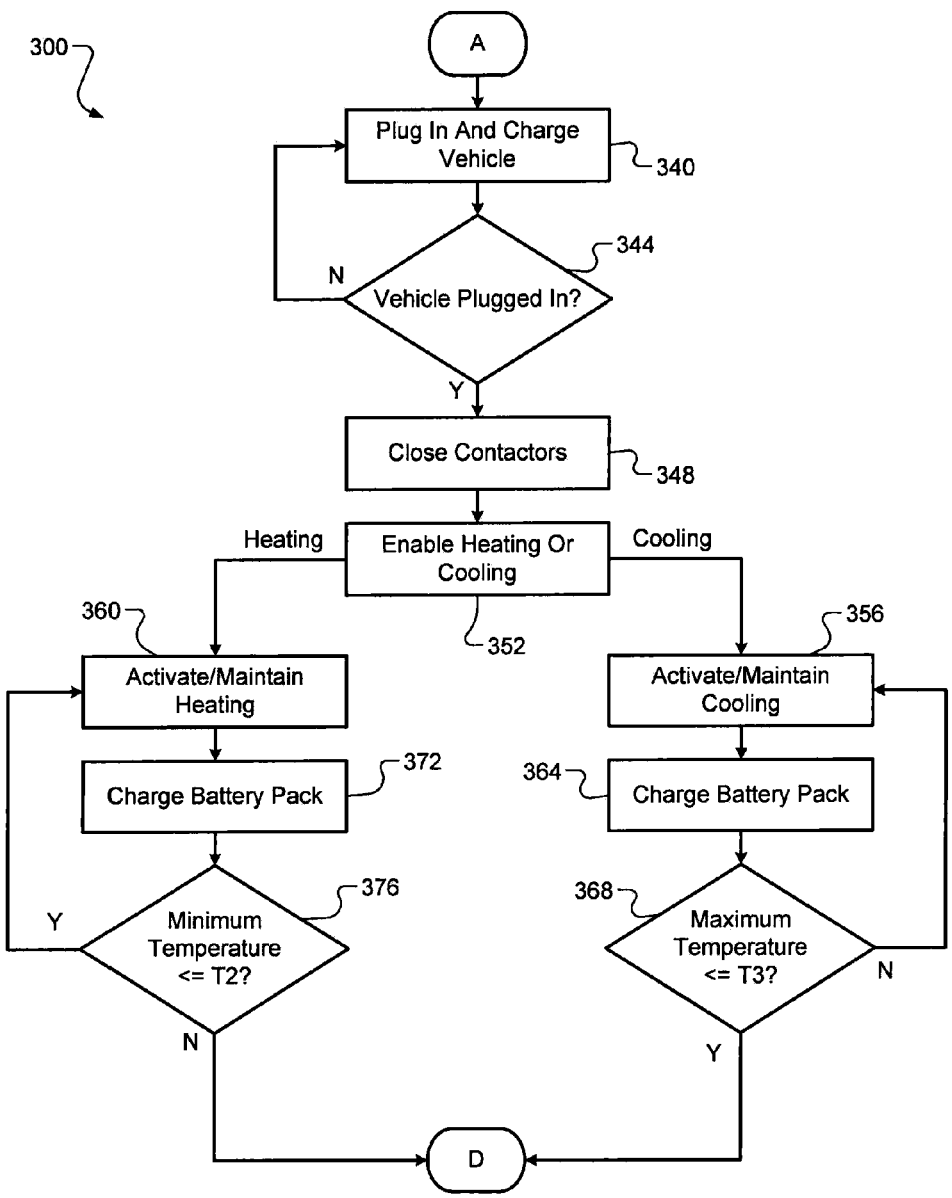

Referring now to FIGS. 3A, 3B, 3C, and 3D, a method 300 for operating an electric vehicle begins at 304 in FIG. 3A. At 308, the vehicle is keyed on. At 312, the method 300 determines minimum and maximum battery module temperatures. For example, the method 300 determines a minimum temperature of all the battery modules within a battery pack of the vehicle, and a maximum temperature of all the battery modules within the battery pack. At 316, the method 300 determines whether the minimum temperature is less than or equal to T1. If true, the method 300 enables heating and continues to A as shown in FIG. 3B. If false, the method 300 continues to 320.

Figure 3D:
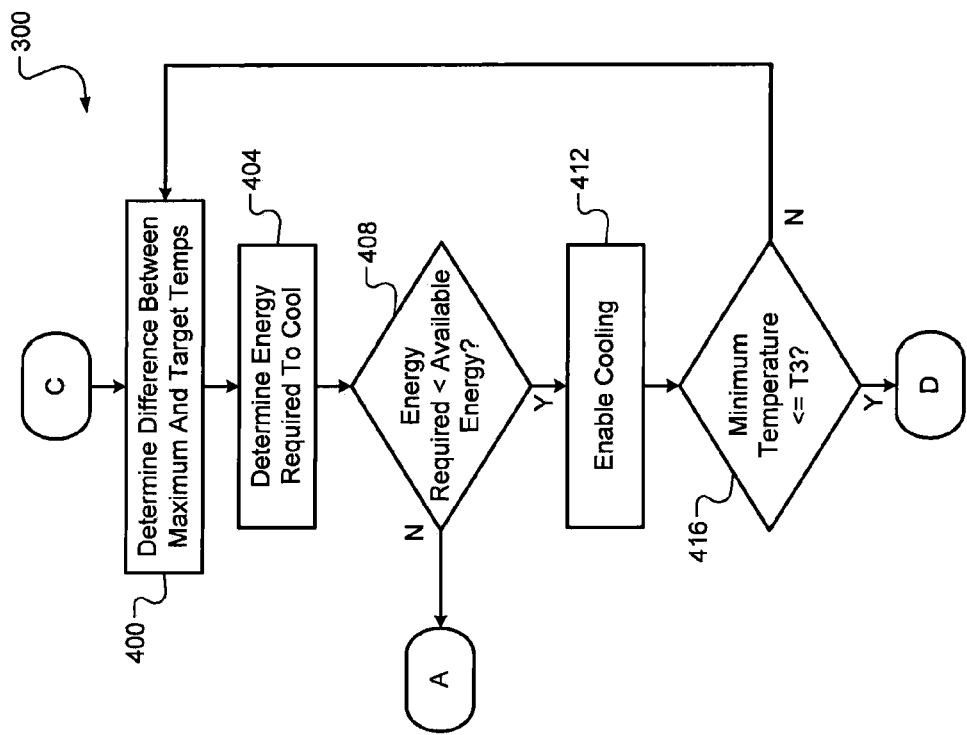
Figure 3C:
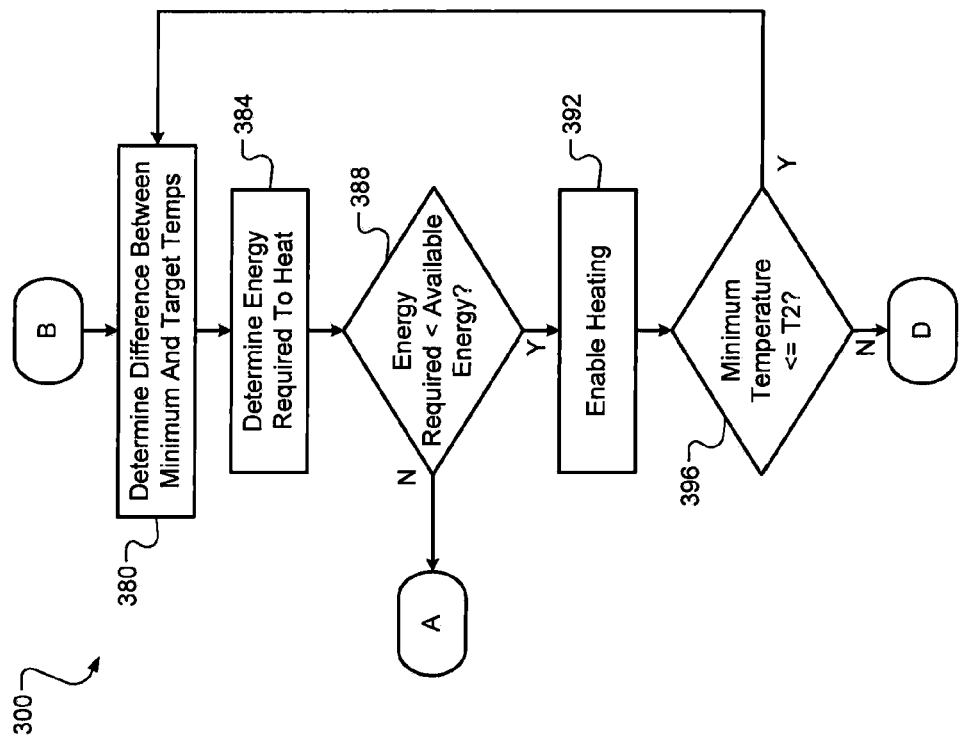

At 320, the method 300 determines whether the minimum temperature is less than or equal to T2. If true, the method 300 continues to B as shown in FIG. 3C. If false, the method 300 continues to 324. At 324, the method 300 determines whether the maximum temperature is less than or equal to T3. If true, the method 300 continues to 328. If false, the method 300 continues to 332. At 332, the method 300 determines whether the maximum temperature is less than or equal to T4. If true, the method 300 continues to C as shown in FIG. 3D. If false, the method 300 enables cooling and continues to A as shown in FIG. 3B. At 328, the method 300 determines that the temperatures are within the normal operating range of the vehicle and allows the vehicle to be turned on. The method 300 ends at 336.

Referring now to FIG. 3B, the method 300 continues at A. At 340, the method 300 provides an indication that the vehicle should be plugged in and charged. At 344, the method 300 determines whether the vehicle is plugged in. If true, the method 300 continues to 348. If false, the method 300 continues to provide an indication that the vehicle should be plugged in at 344. At 348, the method 300 ensures that contactors of the battery pack are closed to enable charging. At 352, the method 300 enables heating or cooling based on whether the method arrived at A from 332 or 316, respectively. If cooling is enabled, the method 300 continues to 356. If heating is enabled, the method 300 continues to 360.

At 356, the method 300 activates and/or maintains cooling. For example, the method 300 activates an air conditioner/compressor and opens any valves associated with a coolant system of the vehicle. At 364, the method 300 charges the battery pack. At 368, the method 300 determines whether the maximum temperature is less than or equal to T3. If true, the method 300 continues to D. If false, the method 300 continues to 356.

At 360, the method 300 activates and/or maintains heating. For example, the method 300 activates a heater and opens any valves associated with the coolant system of the vehicle. At 372, the method 300 charges the battery pack. At 376, the method 300 determines whether the minimum temperature is less than or equal to T2. If true, the method 300 continues to 360. If false, the method 300 continues to D.

During either of heating and cooling, the method 300 may further determine an amount of power to direct to heating or cooling and an amount of power to direct to charging the battery pack. For example, if the amount of power available is in a first range (e.g., approximately 6000 watts), then the method 300 may direct 3000 watts to heating or cooling and 3000 watts to charging the battery pack. If the amount of power available is in a second range (e.g., approximately 1000 watts), then the method 300 may direct 750 watts to heating or cooling and 250 watts to charging the battery pack. Or, the method 300 may direct a predetermined minimum amount of power to heating or cooling (e.g., 750 watts) and the remaining amount of power (e.g., available power—750 watts) to charging the battery pack. In other words, the method 300 may direct different proportions of the available power to heating or cooling and charging the battery pack based on the amount of power available.

Referring now to FIG. 3C, the method 300 continues at B. At 380, the method 300 determines a difference between the current minimum temperature and a target temperature. For example, the target temperature may be slightly (e.g., one or two degrees) above T2. At 384, the method 300 determines an amount of energy needed to heat the battery pack from the current minimum temperature to the target temperature based on the difference. The determination may include an amount of energy needed to drive the vehicle the predetermined distance as described above in FIG. 2. At 388, the method 300 determines whether the amount of energy needed is less than an amount of available energy in the battery pack. If true, the method 300 continues to 392. If false, the method 300 continues to A.

At 392, the method 300 enables heating for a predetermined period. For example only, the predetermined period may be a calibrated period, or may be based on the amount of energy needed to heat the battery pack from the current minimum temperature to the target temperature At 396, the method 300 determines whether the current minimum temperature is less than or equal to T2. If true, the method 300 continues to 380. If false, the method 300 continues to D.

Referring now to FIG. 3D, the method 300 continues at C. At 400, the method 300 determines a difference between the current maximum temperature and a target temperature. For example, the target temperature may be slightly (e.g., one or two degrees) below T3. At 404, the method 300 determines an amount of energy needed to cool the battery pack from the current maximum temperature to the target temperature based on the difference. The determination may include an amount of energy needed to drive the vehicle the predetermined distance. At 408, the method 300 determines whether the amount of energy needed is less than an amount of available energy in the battery pack. If true, the method 300 continues to 412. If false, the method 300 continues to A.

At 412, the method 300 enables either passive cooling or active cooling for a predetermined period. The predetermined period may be a calibrated period, or may be based on the amount of energy needed to cool the battery pack from the current minimum temperature to the target temperature. For example, for passive cooling, the method 300 may simply allow a vehicle radiator and/or ambient air to cool the battery pack. The method 300 may enable passive cooling when ambient air temperature is cooler (e.g., 1 degree Celsius or more) than the current maximum temperature. Conversely, for active cooling, the method 300 activates the air conditioner/compressor (e.g., when ambient temperature is not at least a predetermined amount cooler than the current maximum temperature). At 416, the method 300 determines whether the current maximum temperature is less than or equal to T3. If true, the method 300 continues to D. If false, the method 300 continues to 400.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system, comprising:
a battery control module configured to determine at least one temperature associated with a battery pack of an electric vehicle; and
an electric vehicle control module configured to select between a plurality of operating modes of the electric vehicle based on the at least one temperature, wherein the plurality of operating modes includes:
a first mode, wherein the electric vehicle control module prevents the electric vehicle from starting up in response to a determination that the battery pack does not have sufficient energy to adjust the at least one temperature of the battery pack to within a predetermined usage range; and
a second mode, wherein the electric vehicle control module allows the electric vehicle to start up in response to a determination that the battery pack has sufficient energy to adjust the at least one temperature a predetermined amount and to drive the vehicle a predetermined distance.

2. The system of claim 1, wherein the at least one temperature includes a minimum temperature and a maximum temperature of battery modules within the battery pack.

3. The system of claim 1, wherein:
the electric vehicle control module selects the second mode when the at least one temperature is greater than a first temperature threshold and less than or equal to a second temperature threshold that is greater than the first temperature threshold; and
the electric vehicle control module selects the first mode when the at least one temperature is less than or equal to the first temperature threshold.

4. The system of claim 3, wherein the electric vehicle control module further selects the second mode when the at least one temperature is greater than a third temperature threshold that is greater than the second temperature threshold, and less than or equal to a fourth temperature threshold that is greater than the third temperature threshold.

5. The system of claim 4, wherein the electric vehicle control module further selects the first mode when the at least one temperature is greater than the fourth temperature threshold.

6. The system of claim 4, wherein:
the plurality of operating modes includes a third mode;
the electric vehicle control module selects the third mode when the at least one temperature is greater than the second temperature threshold and less than or equal to the third temperature threshold; and
in the third mode, the electric vehicle control module allows the electric vehicle to be driven.

7. The system of claim 1, wherein in the first mode, the electric vehicle control module provides an indication that the electric vehicle should be plugged in and charged.

8. The system of claim 1, wherein in the second mode, the electric vehicle control module enables at least one of heating and cooling of the battery pack to adjust the at least one temperature.

9. The system of claim 1, wherein the determination is based on a difference between the at least one temperature and a target temperature.

10. A method, comprising:
determining at least one temperature associated with a battery pack of an electric vehicle; and selecting between a plurality of operating modes of the electric vehicle based on the at least one temperature, wherein the plurality of operating modes includes:
- a first mode, wherein the electric vehicle is prevented from starting up in response to a determination that the battery pack does not have sufficient energy to adjust the at least one temperature of the battery pack to within a predetermined usage range; and
- a second mode, wherein the electric vehicle is allowed to start up in response to a determination that the battery pack has sufficient energy to adjust the at least one temperature a predetermined amount and to drive the vehicle a predetermined distance.

11. The method of claim 10, wherein the at least one temperature includes a minimum temperature and a maximum temperature of battery modules within the battery pack.

12. The method of claim 10, further comprising:
selecting the second mode when the at least one temperature is greater than a first temperature threshold and less than or equal to a second temperature threshold that is greater than the first temperature threshold; and
selecting the first mode when the at least one temperature is less than or equal to the first temperature threshold.

13. The method of claim 12, wherein the selecting the second mode includes selecting the second mode when the at least one temperature is greater than a third temperature threshold that is greater than the second temperature threshold, and less than or equal to a fourth temperature threshold that is greater than the third temperature threshold.

14. The method of claim 13, wherein selecting the first mode includes selecting the first mode when the at least one temperature is greater than the fourth temperature threshold.

15. The method of claim 13, wherein the plurality of operating modes includes a third mode, and further comprising:
selecting the third mode when the at least one temperature is greater than the second temperature threshold and less than or equal to the third temperature threshold; and
in the third mode, allowing the electric vehicle to be driven.

16. The method of claim 10, further comprising, when in the first mode, providing an indication that the electric vehicle should be plugged in and charged.

17. The method of claim 10, further comprising, when in the second mode, enabling at least one of heating and cooling of the battery pack to adjust the at least one temperature.

18. The method of claim 10, wherein the determination is based on a difference between the at least one temperature and a target temperature.

* * * * *